United States Patent [19]

Kramer et al.

[11] Patent Number: 4,607,964

[45] Date of Patent: Aug. 26, 1986

[54] WATER LUBRICATED BEARING

[75] Inventors: James H. Kramer, Akron; Roy L. Orndorff, Jr., Kent, both of Ohio

[73] Assignee: The B. F. Goodrich Company, Akron, Ohio

[21] Appl. No.: 803,196

[22] Filed: Dec. 2, 1985

Related U.S. Application Data

[63] Continuation-in-part of Ser. No. 692,138, Jan. 17, 1985, abandoned.

[51] Int. Cl.[4] .................. F16C 17/14; F16C 33/22
[52] U.S. Cl. ................................. 384/98; 384/263; 384/904
[58] Field of Search ......................... 384/97–99, 384/101, 102, 125, 129, 131, 261, 263, 265, 266, 274, 904; 308/1 R, 1 A, DIG. 12

[56] References Cited

U.S. PATENT DOCUMENTS

| 3,454,309 | 7/1969 | Ingham et al. | 384/102 |
| 3,993,371 | 11/1976 | Orndorff, Jr. | 384/97 |
| 4,387,937 | 6/1983 | Fournier et al. | 384/1 A X |
| 4,394,091 | 7/1983 | Klomp | 384/101 |

Primary Examiner—Stuart S. Levy
Assistant Examiner—David Werner
Attorney, Agent, or Firm—Joseph Januszkiewicz

[57] ABSTRACT

A water lubricated bearing assembly having a plurality of circumferentially spaced first set of bearing elements with substantially flat surfaces and water courses therebetween supporting a shaft for rotation. Certain ones or all of such bearing elements support a second set of bearing elements that are moveable radially into supporting engagement with the shaft such that either the first set or the second set of bearing elements are the prime supports for the shaft and wherein such first and second set of bearing elements have different coefficient of friction.

15 Claims, 13 Drawing Figures

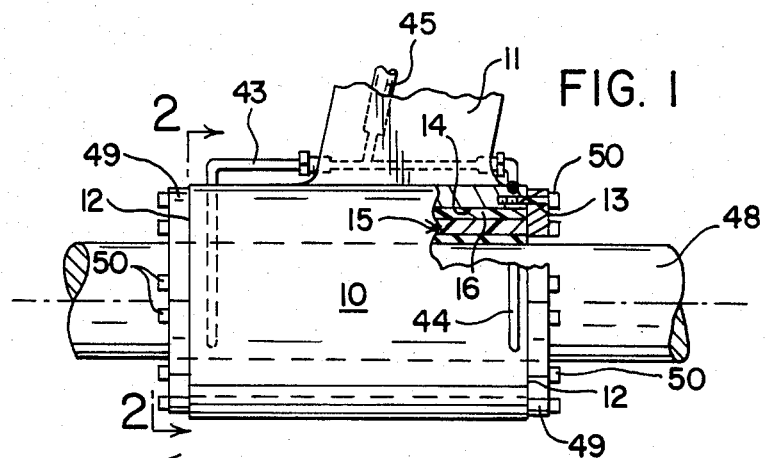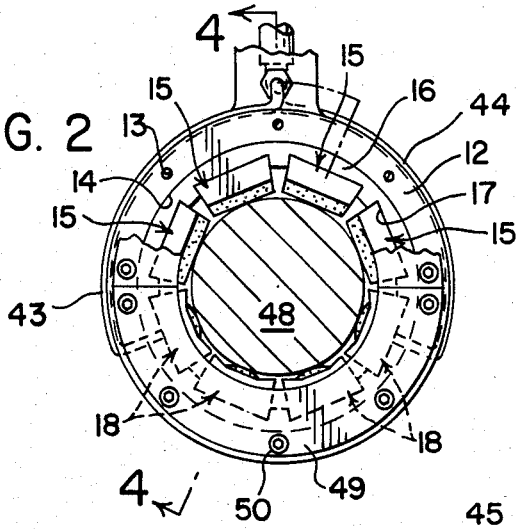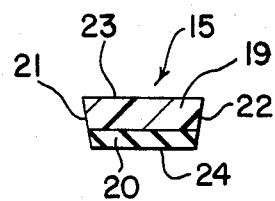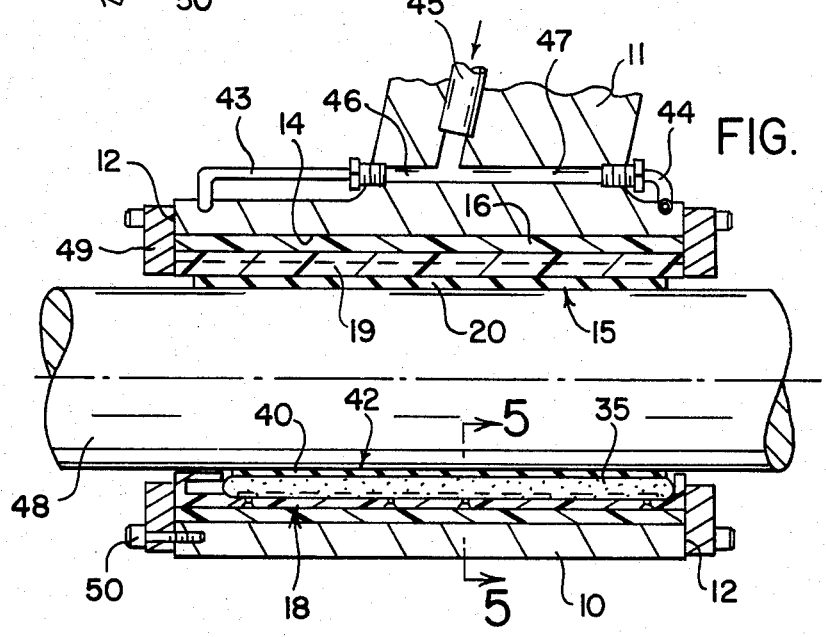

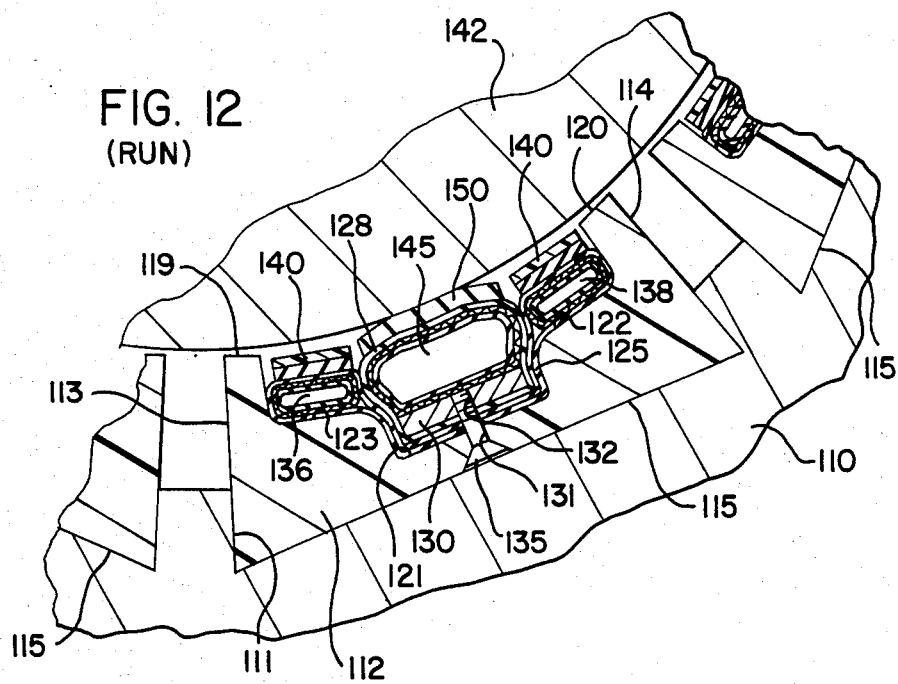
FIG. 12 (RUN)
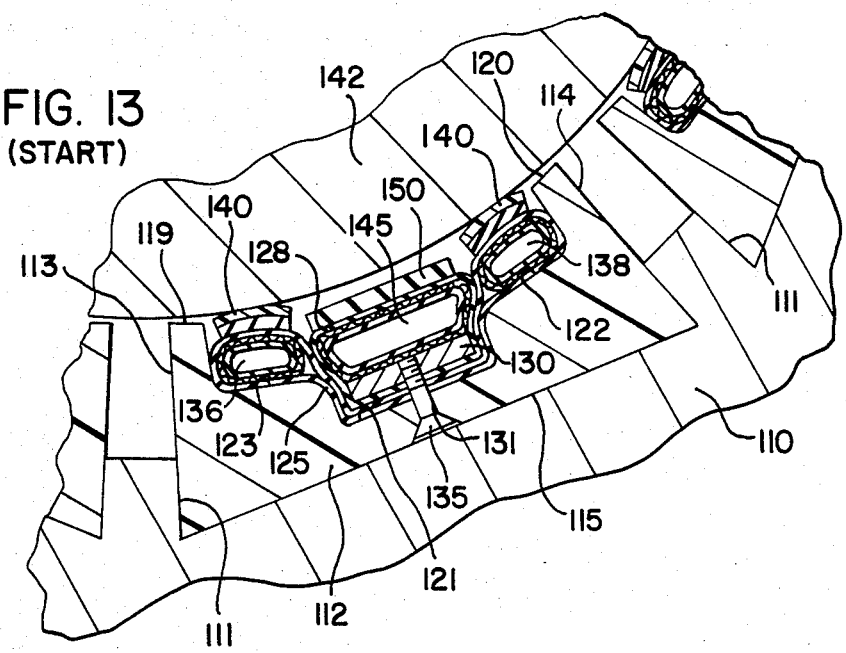
FIG. 13 (START)

4,607,964

WATER LUBRICATED BEARING

This is a continuation-in-part of application Ser. No. 692,138, filed Jan. 17, 1985, now abandoned.

BACKGROUND OF THE INVENTION

This invention relates to a bearing assembly and more particularly to elastomeric journal bearing assemblies which are used in supporting marine propeller shafts such as in ships. Elastomeric journal bearing assemblies have been found to be particularly suited for this purpose because of their exceptional ability to withstand the harmful effects of corrosive fluids and to abrasion resulting from bits of foreign materials which are carried in suspension in the sea water or other liquids in which the shaft and journal bearing assembly operate. Such elastomeric journal bearing assemblies have been made with circumferentially spaced flat rubber surfaces because it has been found that smooth rubber lubricated with water has a very low coefficient of friction. A serious limitation to water lubricated rubber bearings is the high coefficient of friction of dry rubber during start of rotation or at very low rotation of the shaft. Attempts to overcome this have been directed to continual rotation of the shaft at a slow idle speed, however, this is not a satisfactory solution. Another attempt to solve difficult start-up is to precondition the bearings for starting by pumping water into the groove between bearings, however, it is extremely difficult to introduce water to the area between the shaft and the flat rubber surface that is in frictional contact with the shaft.

The present invention provides a new and improved elastomeric bearing assembly that has a plurality of circumferentially spaced elastomeric bearing elements or segments divided by the longitudinal spaced water groove for low friction running and with the additional feature of radially moveable plastic inserts located within the spaced elastomeric bearing elements for operational use in start up. Thus provisions are made for low friction resistance during start up by running the shaft on plastic inserts and once sufficient speed is achieved, the shaft is run on the water lubricated elastomeric elements by retracting the plastic inserts so that the shaft only contacts the circumferentially spaced elastomeric bearing elements. A modification of this structure is to make the circumferentially spaced elastomeric bearing elements radially moveable within circumferentially spaced plastic support elements whereby the propeller shaft is selectively supported by either the plastic or the elastomeric elements for rotation. A further modification is to provide a stave with moveable elastomeric bearing elements and moveable plastic bearing elements whereby the propeller shaft is selectively supported by one or the other moveable elements. With such structure there will be an effective reduction in power consumed as well as a reduction in noise generated. Further modifications use only selected bearings that have moveable inserts which are generally located on the lower portions of the bearing assembly.

SUMMARY OF THE INVENTION

The present invention is directed to a new and improved water lubricated bearing assembly having a rigid outer housing that supports a plurality of circumferentially spaced bearing elements of elastomeric material having radially inwardly disposed bearing surfaces divided by longitudinally extending water passages or grooves. Certain ones or all of the bearing elements have an insert therein of plastic material which may be projected beyond the surface of the elastomeric bearing elements. A shaft is supported selectively by either the plastic material to provide bearing surfaces with a low coefficient of friction under dry starting conditions or an elastomeric bearing surface with a low coefficient of friction under water lubricated conditions for friction. As a modification, the bearing assembly can have bearing elements composed of both elastomeric or plastic elements selectively moveable into contact with the shaft to be rotated such that either the circumferentially spaced plastic elements or the rubber bearing elements are in contact with the drive shaft.

BRIEF DESCRIPTION OF THE DRAWINGS

FIG. 1 is a side elevational view of a strut and bearing assembly for supporting a rotatable shaft;

FIG. 2 is a front elevational view of the strut and bearing assembly taken on line 2—2 of FIG. 1 with a portion of the cap broken away to show the bearing staves;

FIG. 3 is a cross-sectional view of one of the bearing staves;

FIG. 4 is a side elevational view in cross-section of the strut and bearing assembly taken on line 4—4 of FIG. 2;

FIG. 12 is a fragmentary cross-sectional view of a further modified form of the invention showing a portion of the bearing assembly with moveable elastomeric elements and moveable plastic elements in the run condition;

FIG. 13 is a fragmentary cross-sectional view of a portion of the bearing assembly of the plastic staves with their moveable elements similar to FIG. 12 but in a starting condition for the drive shaft.

DETAILED DESCRIPTION

Figure 5:
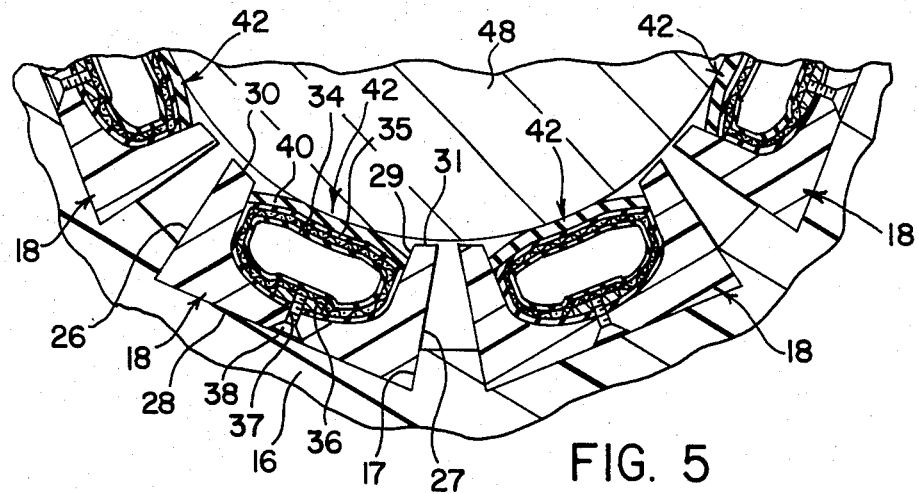
FIG. 5 is a fragmentary cross-sectional view of a portion of the bearing assembly of plastic staves and their elastomeric inserts taken on line 5—5 of FIG. 4 for a rotating condition of a drive shaft.
Figure 6:
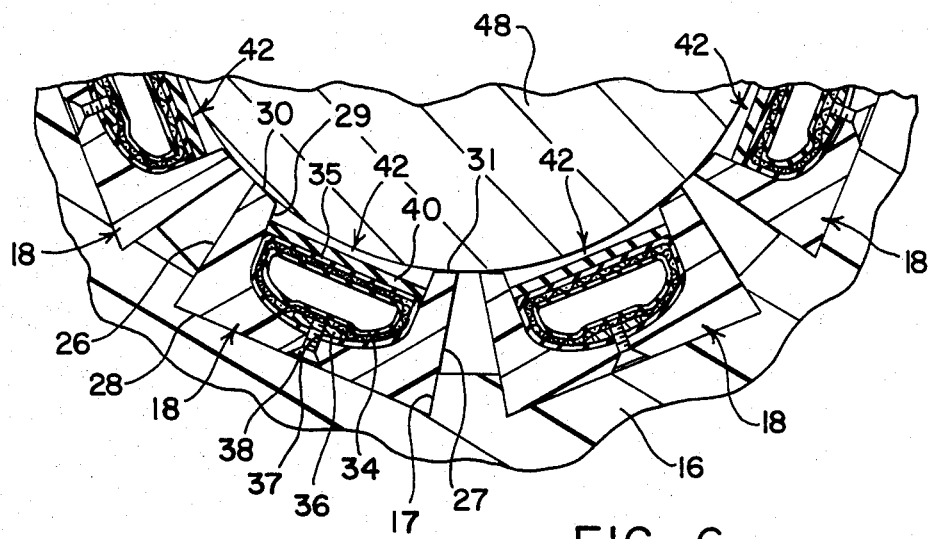
FIG. 6 is a fragmentary cross-sectional view of a portion of the bearing assembly of the plastic staves and their inserts similar to FIG. 5 but in a starting condition for the drive shaft.

Referring to the drawings, wherein like reference numerals designate like or corresponding parts throughout the several views, there is shown in FIG. 1 a longitudinally extending bearing housing 10 supported by a strut 11. Housing 10 has a pair annular end faces 12, with each end face having a plurality of circumferentially spaced threaded bores 13 extending longitudinally therein. The housing 10 has a central bore 14 to accommodate a bearing assembly to be described. The bearing assembly can be a single cast unit or composed of a plurality of circumferentially spaced bearing segments or staves. In the example above, the central bore 14 receives a cylindrical shell 16 having a plurality of circumferentially spaced dovetailed grooves 17 suitably machined therein. As seen in FIG. 2, there are eight dovetail grooves 17 with four of the upper grooves 17 receiving staves or bearing segments 15 and the lower grooves 17 receiving four staves 18. The staves 15 as seen in FIG. 3 are composed of a rigid layer of ultra high molecular weight polyethylene material 19 suitably bonded to a layer of elastomeric material 20. Stave 15 is trapezoidal in cross-sectional shape having a pair of side surfaces or faces 21–22, a linear disposed outer flat face 23 and an inner flat bearing face or surface 24. A portion of the respective side surfaces 21 and 22 are in abutting contact with the dovetailed grooves 17. All of staves 18 are similar in construction and only one will be described. Stave 18 (FIG. 5) is of trapezoidal cross sectional shape made from an ultra high molecular weight polyethylene material with tapering side surfaces 26–27, an outer flat face 28 and a centrally disposed recess 29 which leaves a pair of linear surfaces 30 and 31 on the radially innermost portion of the stave. As seen in FIGS. 4 and 5, portions of the respective side surfaces 26 and 27 are received by the lower dovetailed grooves 17.

The central recess 29 on the lower four staves 18 extends downwardly therein providing an arcuately shaped bottom surface therein. A relatively flat tubular hose 34 is located within such recess 29 having an outer rubberized distensible fabric 35 encompassing such tubular hose 34 and forms a cylindrical tube. A longitudinally extending plate member 36 is located between tubular hose 34 and the rubberized fabric 35. Each segment 18 has a plurality of bores 37 along the radial outer portion. Each bore 37 receives a threaded bolt 38 that is suitably threadedly connected to the plate member 36, thus retaining the distensible fabric 35 and inflatable hose 34 within recess 29. The radially inwardly most surface of cylindrical shaped distensible fabric 35 is bonded to a flat thin layer of elastomer or rubber 40 of medium softness such as 65 to 80 Durometer A scale, with a width approximately 10 times its thickness. Such thin layer of rubber 40 can be vulcanized to the cylindrical shaped distensible rubberized fabric 35. The respective layers of rubber 40, tube and hose 34, and fabric 35 form the plurality of circumferentially spaced bearing elements 42.

The respective tubular hoses 34 in the four staves 18 are interconnected by suitable hoses in series and the respective ends of such hoses as seen in FIG. 1 are connected radially outwardly to conduits 43 and 44 which are located along suitable grooves along the outer periphery of the housing 10. A conduit 45 located in the strut 11 communicates via suitable passageways 46 and 47 to conduits 43 and 44. Conduit 45 is connected to a suitable pressure source not shown that can selectively deflate or pressurize the respective hoses 34 within the recesses 29 of staves 18 to project the bearing element 42 and its radial innermost surface of rubber layer 40 into frictional contact with a shaft 48, thereby eliminating all frictional contact between shaft 48 and surfaces 30 and 31 of segment or stave 18. In this described condition, shaft 48 only makes contact with the rubber surfaces or layer 40, which is the normal condition for running shaft 48.

Figure 10:
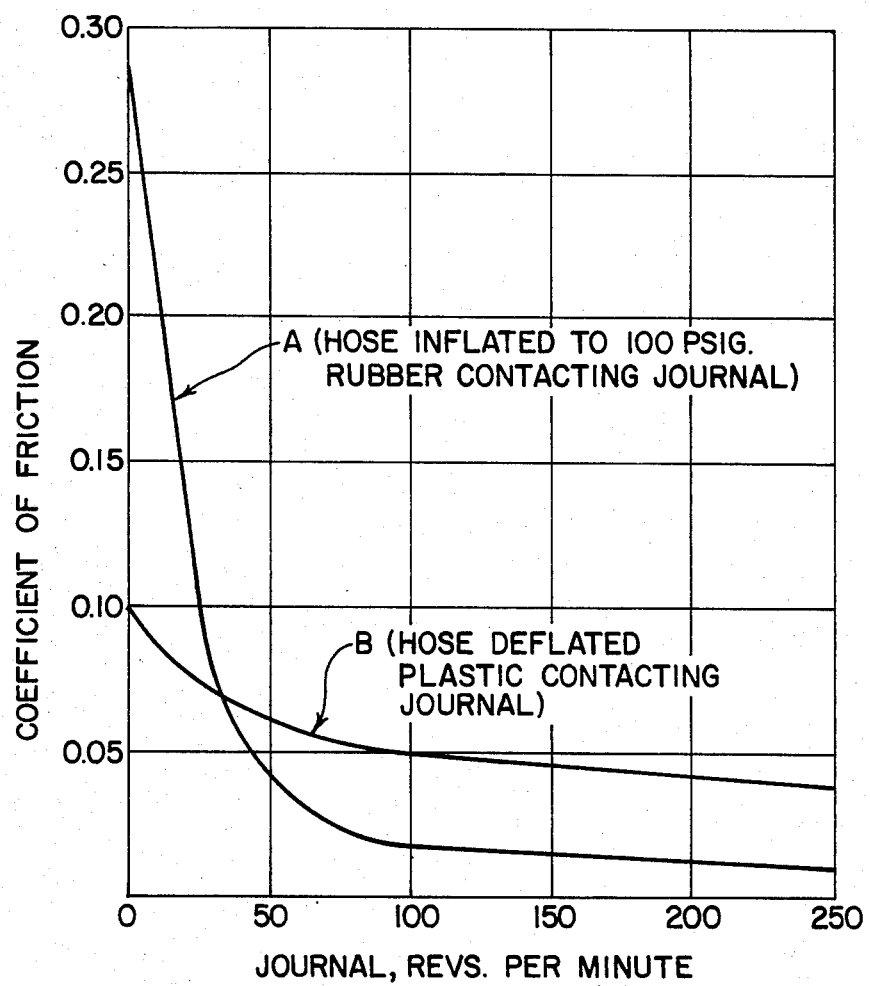
FIG. 10 is a graph of a test performed illustrating the difference in coefficient of friction between running a shaft on rubber bearings versus running a shaft on ultra-high molecular weight bearings.

In the operation of the bearing assembly (FIGS. 4 and 5), assume that shaft 48 is stationary and that hose 34 is in a deflated condition. Shaft 48 under these conditions will remain in contact with the plastic surfaces 30 and 31 of stave or bearing segments 18 and in light contact with the rubber surfaces 24 of stave 15. In this condition the circumferentially spaced plastic bearing surfaces 30 and 31 form the primary set of circumferentially spaced bearing elements which support shaft 48. As shaft 48 is begun to be rotated, the primary friction to be overcome will be between shaft 48 and the plastic surfaces 30 and 31 which is relatively low. During this period of start up, water will be circulating between shaft 48 and the radial innermost surfaces of the rubber layer 40. As the shaft continues to increase in speed, hose 34 is pressurized thereby moving the radial surfaces of rubber layers 40 (which form a second set of circumferentially spaced bearing elements) into contact with the shaft 48 as depicted by FIG. 5 eliminating contact between the shaft 48 and the first set of bearing elements (bearing surfaces 30 and 31). In this condition of operation, the smooth rubber surfaces of layers 40 are lubricated with water providing a very low coefficient of friction such that no special lubricant is required. Thus the rubber layer or bearing elements 40 are used to support the load of shaft 48 only when the velocity of shaft 48 is sufficiently high enough to form a proper lubricating film between the shaft and the rubber surface of layer 40 of staves 18 as fluid is circulated through the clearance space around the shaft 48. Below this velocity and especially at zero verlocity or start-up, the load of shaft 48 is supported primarily by the surfaces of the ultra high molecular weight polyethylene surfaces 30 and 31. The polyethylene surfaces have very low and constant dry friction force values. The constant pressure support provided by the layer of rubber 40 due to the inflation of the hose 34 will lower the coefficient of friction due to a thin film of lubricating water which flows around the shaft 48. Such rubber bearing elements efficiently utilize the low cost lubricant of dirty water that is readily available everywhere. The rubber effectively passes the dirt particles without damage to itself or the metal shaft 48. FIG. 10 illustrates this condition wherein Curve A was obtained when the hose was inflated to 100 pounds per square inch gauge pressure (psig) or 703,100 kgs per square meter and only the rubber surfaces were in contact with the shaft. Curve B represents the condition where the hose is deflated and the shaft 48 is supported primarily by the high molecular weight plastic bearings for all velocity values. The point where the curves cross (31 RPM) is the operating point where the bearing surfaces would be shifted by inflation of the hose to achieve greater efficiency of operation.

The bearing assembly is retained within the central bore 14 of housing 10 by a pair of semi-circular retainer rings 49 acting as retainer means mounted on the respective end faces 12 of the cylindrically shaped housing 10. Rings 49 have a plurality of circumferentially spaced bores which receive cap screws 50 which are threaded into the respective bores 13 to thereby securely fasten the bearing assembly within the housing 10 and place on the shaft 48.

A modification of the described embodiment is to have all staves in the bearing assembly of the same construction as that of staves 18 rather than some of the construction of staves 15 and other as staves 18. All of the tubes 34 within staves 18 would be inflated or deflated simultaneously thus presenting either the rubber layer or the plastic portion of the staves to the shaft 48. The operation of this modification is substantially identical to that of the first described embodiment.

Figure 7:
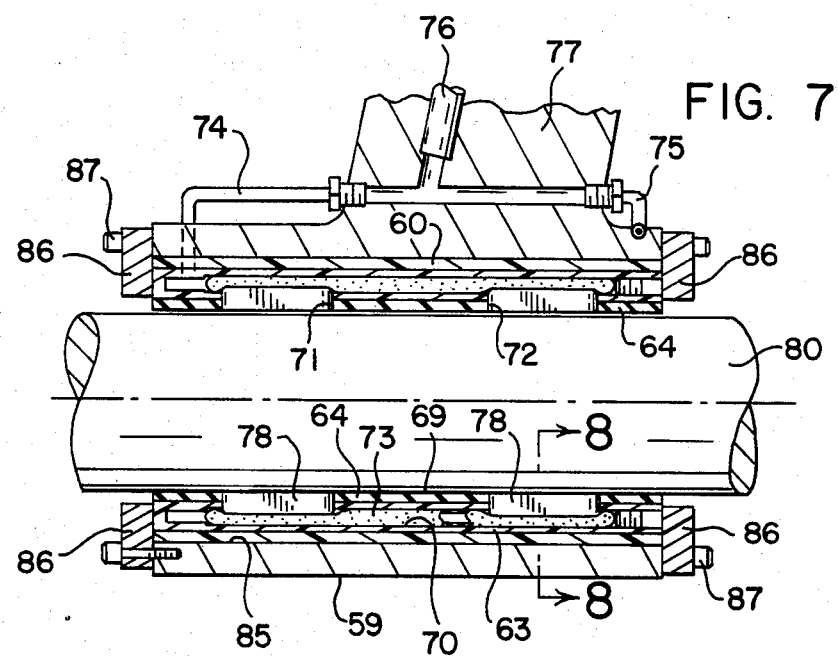
FIG. 7 is a side elevational cross-sectional view of a modified form of the strut and bearing assembly similar to FIG. 4.
Figure 8:
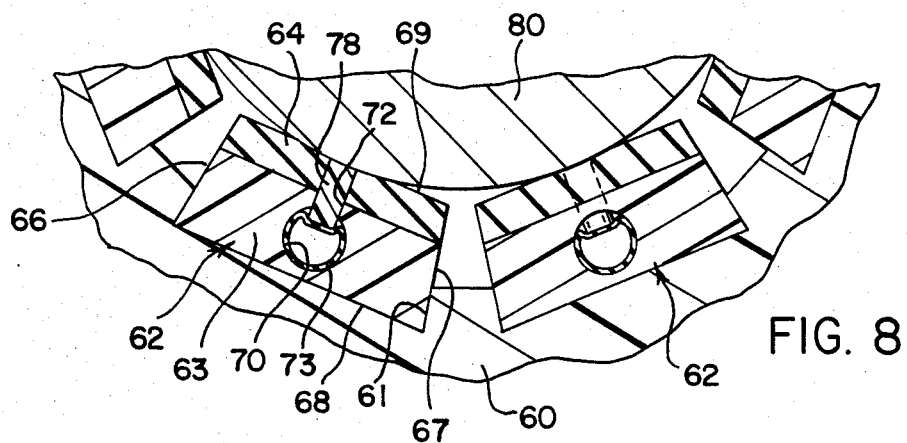
FIG. 8 is a fragmentary cross-sectional view of the bearing assembly with elastomeric staves and their plastic inserts taken on line 8—8 of FIG. 7 showing a shaft in a run condition.
Figure 9:
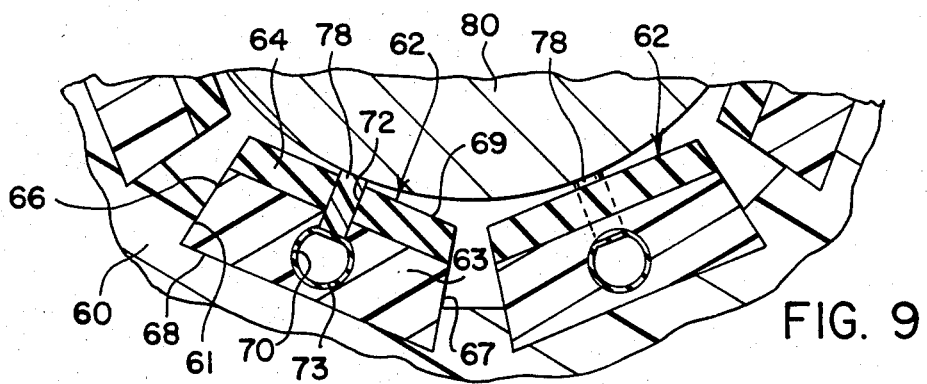
FIG. 9 is a fragmentary cross-sectional view of the bearing assembly, shown in FIG. 8 but with the plastic inserts radially extended and contacting the shaft in a starting condition.

A further modification of the described embodiment is shown in FIGS. 7 through 9 wherein the housing 59 supports a cylindrical shell 60 having a plurality of circumferentially spaced dovetailed grooves 61 suitably machined therein. Each dovetailed groove 61 receives a stave 62 composed of a rigid layer 63 of ultra high molecular weight polyethylene suitably bonded to a layer 64 of elastomeric material. All of the staves 62 are similar in construction and only one will be described. Stave 62 is trapezoidal in cross-sectional shape having side surfaces 66–67, a linear outer flat face 68 and a flat bearing surface 69 for the elastomeric layer 64. A portion of the respective side surfaces 66 and 67 are in abutting contact with the dovetailed groove 61 to maintain the staves 62 in their respective positions.

An elastomer is defined as a substance that can be stretched at room temperature to at least twice its original length and, after having been stretched and the stress removed, returns with force to approximately its original length in a short time. (See Glossary of Terms as prepared by ASTM Committee on Rubber and Rubberlike Materials, published by the American Society for Testing Materials.)

The elastomeric or rubber material that can be used can be any of the well known elastomers including, for example, natural rubber, copolymers of butadiene and acrylonitrile, copolymers of butadiene and styrene, copolymers of butadiene and alkyl acrylates, butyl rubber, olefin rubbers such as ethylene-propylene and EPDM rubber, fluorocarbon rubbers, fluorisilicone rubbers, silicone rubbers, chlorosulfonated polyethylene, polyacrylates, polybutadiene, polychloroprene, and the like.

The bearing element layer 63 is made of high molecular weight polyethylene having a melt flow index less than 0.15.

To prepare such bearing segments, element or stave 62, an elongated flat layer of elastomeric material such as nitrile rubbers such as polymers of butadiene and acrylonitrile is placed flat into a mold along with a layer of ultra high molecular weight polyethylene which is then molded and vulcanized into a desired shape. Such staves may be molded into a trapezoidal shape or suitably machined to the precise size and shape. Each stave 62 as seen in FIG. 7 has a bore 70 extending longitudinally therein substantially for the full length thereof. In addition, each stave 62 has a pair of recesses 71 and 72 (FIG. 7) along their inner flat bearing surface 69 that extend from such surface 69 into bore 70. The respective bores 70 of each stave 62 houses a portion of an elongated hose 73, which hose 73 extends into all of the staves, such that hose 73 is a continuous hose having its respective ends connected to a pair of conduits 74 and 75 for further connection to a passageway and conduit 76 located in strut 77. Conduit 76 is connected to a suitable pressure source not shown that can selectively deflate or pressurize the hose 73 within the bores of staves 62 to control the radial movement of a rectangular shaped plastic insert 78 that is located in each recess 71 and 72 of stave 62. The plastic inserts 78 are made from a plastic material such as Teflon ® or an ultra high molecular weight polyethylene material. Thus, as seen in FIGS. 7 through 9, a drive shaft 80 is supported by either the plastic inserts 78 (FIG. 9) or by the flat surface of elastomeric layer 64.

The bearing assembly is retained within a central bore 85 in housing 59 by a pair of semi-circular retainer rings 86 acting as retainer means mounted on the respective end sections of the cylindrically shaped housing 59. Rings 86 have a plurality of circumferentially spaced bores which receive cap screws 87 which are threaded into threaded bores in housing 59 to thereby securely fasten the bearing assembly to the housing 59 supporting shaft 80.

In the operation of the above described bearing assembly (FIGS. 7–9), assume that shaft 80 is stationary and that hose 73 is in a deflated condition as depicted by FIG. 8. Shaft 80 under these conditions is in contact with the rubber surface of layer 64 of bearing segments or stave 62. Prior to attempting to start the rotation of shaft 80, pressurized fluid is introduced into hose 73 to distend such hose which moves the respective moveable plastic bearings 78 radially inwardly toward the axis of shaft 80, such that shaft 80 rests entirely on the plastic surfaces of bearings 78. Under these conditions water circulates through the clearance spaces between shaft 80 and the rubber bearing surfaces of layer 64 fully lubricating such rubber surfaces. Under these conditions of starting the rotation of shaft 80, the coefficient of friction of bearings 78 is very low when compared to the rubber bearing surfaces of layer 64. (Note FIG. 10). The coefficient of starting friction of running the shaft 80 on plastic such as Teflon ® or ultra high molecular weight polyethylene is 0.10 compared to a coefficient of starting friction of 0.28 when started on rubber. At approximately 30 to 35 revolutions per minute of shaft 80, hose 73 is relieved of the pressurized fluid such that the respective plastic bearings 78 are moved radially outwardly thereby allowing shaft 80 to be resting completely on the lubricated rubber bearing layers 64 with clearance spaces between the respective bearings or staves 62 and shaft 80 allowing for the continued circulation of water. The coefficient of friction of the water lubricated rubber bearings is many times less than a bearing surface made from ultra high molecular weight polyethylene materials.

Figure 11:
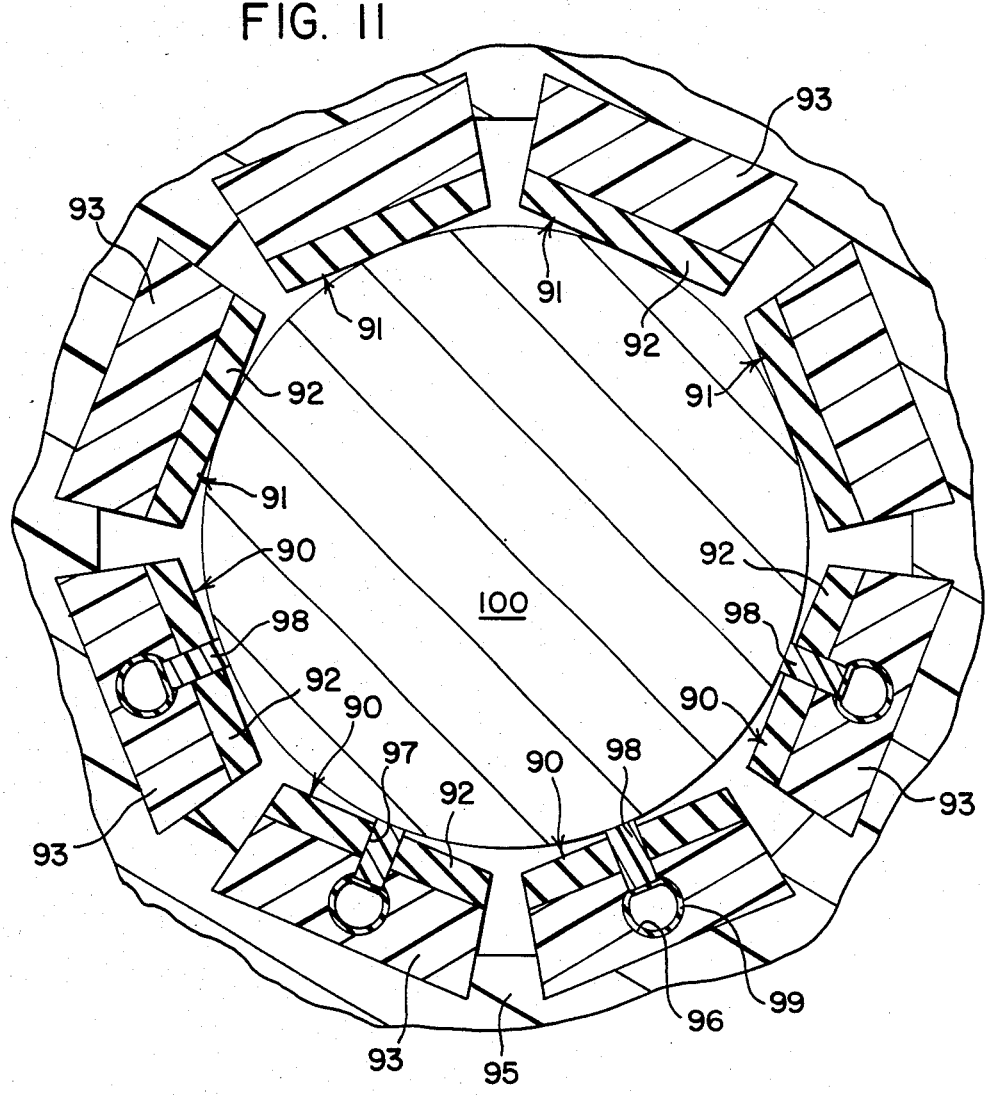
FIG. 11 is a cross-sectional view of a modified form of the invention.

Modifications of the above described embodiment are to have the lower four bearing segments or staves constructed with moveable inserts similar to staves 62 in FIG. 9 while having the remaining other bearing segments or staves similar to staves 15 of FIG. 3 with rubber or elastomeric inner bearing surfaces contacting the drive shaft. FIG. 11 depicts such a modification wherein the bearing assembly has a plurality of lower circumferentially spaced bearing segments or staves 90 and a plurality of upper bearing segments or staves 91. Each of these staves has an inner trapezoidal shaped elastomeric bearing element 92 and an outer trapezoidal shaped bearing support element 93 that is made of an ultra-high molecular weight polyethylene material that is bonded to the elastomeric bearing element 92. Stave 91 is identical to stave 62 discussed above with respect to FIGS. 8 and 9. As in the prior embodiments, the outer shell 95 has a plurality of circumferentially spaced dovetailed grooves which receive staves 90 and 91. The staves 90 and 91 are trapezoidal in cross-section having linear outer flat faces and linear flat bearing surfaces. Each of the staves 90 has a bore 96 extending longitudinally therethrough with a recess 97 communicating with such bore 96. Such recess 97 may be a single recess for each stave or a pair of spaced recesses as in the embodiments shown in FIGS. 7-9. For purposes of discussion herein, a single recess is sufficient to illustrate the invention. Such recess 97 receives a plastic insert 98 which is made from a material such as Teflon ® or a material of ultra high molecular weight polyethylene. Located in the respective bores 96 are elongated hoses 99 or a single hose which, as described in the prior embodiments, is suitably connected to pressurized source of fluid pressure that can inflate such hose to selectively move the plastic insert 98 radially inwardly or outwardly to provide frictional support for the drive shaft 100 or allow shaft 100 to be fully supported by the elastomeric layers of staves 90 and 91.

Such bearing assembly is retained within a central bore of a housing similar to housing 59 of the prior described embodiment and retained therein by retainer rings similar to rings 86 of the prior embodiment.

In operation of the above described bearing assembly, assume that the shaft 100 is stationary and resting on the plastic inserts 98 of staves 90 while being contacted lightly, by the upper staves 91. Fluid pressure is maintained in hose 99 to maintain such hose distended so as to maintain contact between shaft 100 and the inserts 98. Under these conditions, water circulates through the clearance spaces between the shaft 100 and the rubber bearing surfaces such that the coefficient of friction of stave 90 is very low as described above with respect to FIG. 10. At approximately 30 to 35 revolutions per minute of shaft 100, hose 99 is relieved of pressure such that the respective plastic inserts 98 are moved radially away from shaft 100 to thereby put shaft 100 in frictional contact with the rubber lubricated bearing surfaces of the staves.

A further modification of the described embodiment is shown in FIGS. 12 and 13 wherein a housing (not shown but similar to housing 10 or 59) supports a cylindrical shell 110 (similar to shells 16 or 59) having a plurality of circumferentially spaced dovetailed grooves 111 suitably machined therein. Each groove 111 receives a support member or a stave 112 composed of a rigid ultra high molecular weight polyethylene. All of the staves 112 are similar in construction and only one will be described. Stave 112 is essentially trapezoidal in cross-sectional shape having side surfaces 113-114, a linear outer face 115 and centrally disposed stepped recess which leaves a pair of linear surfaces 119 and 120 on the radially innermost portion of the stave.

The stepped recessed in support member or stave 112 has a central portion 121 and a pair of laterally spaced portions 122 and 123. A primary flat sleeve 125 extends across the bottoms of central portion 121 and the pair of laterally spaced portions 122 and 123 of the stepped recess in stave 112. A secondary sleeve 128 is positioned in the central portion 121 of the stepped recess over the flat sleeve 125 and is attached thereto by a longitudinally extending plate member 130. Each stave 112 has a plurality of bores 131 along the radial outer portion communicating with and in alignment with a threaded bore 132 in plate member 130. Bore 131 receives a threaded bolt 135 that is threadedly connected to plate member 130, thus retaining such sleeve in their positions for a purpose to be described. Primary inflatable hoses 136 and 138 are mounted in the outer end portions of sleeve 125 that overlie the pair of laterally spaced portions 122 and 123 of the stepped recess in stave 112. A strip or bearing element of ultra high molecular weight polyethylene (UHMWPE) 140 or other low dry friction material is suitably bonded to the outer end spaced portions of flat sleeve 125 immediately over the primary hoses 136 and 138, respectively. On inflating such hoses 136 and 138, the respective strips 140 of UHMWPE will project outwardly or radially inwardly towards a central shaft 142. An inflatable secondary hose 145 is mounted in secondary sleeve 128, which is in the central portion 121 of the stepped recess of stave 112. A thin flat elastomeric bearing element or strip 150 of medium softness such as 60 to 85 Durometer A scale hardness, is suitably bonded to the radially innermost portion of secondary sleeve 128.

As in the previously described embodiments, the staves 112 may be located only along the lowermost portion of the bearing assembly and the other staves constructed in a manner similar to staves 15 of FIG. 3 with rubber or elastomeric inner bearing surfaces contacting the drive shaft or shaft 142.

The respective tubular inflatable hoses 136 and 138 are interconnected by suitable hoses in series with their respective ends connected as illustrated in FIG. 1 to conduits 43 and 44 which in turn are connected via suitable control means to a pressure source not shown that can be selectively pressurized or deflated to project or retract the bearing elements of the UHMWPE strips 140 into supporting contact with the propeller shaft 142.

The tubular inflatable hose 145 is connected by suitable hoses in series to conduits similar to conduits 43 and 44 as illustrated in FIG. 1 which in turn is connected via suitable contact means to a pressure source not shown that can be selectively pressurized or deflated to project or retract the elastomeric bearing strips 150 into supporting contact with the propeller shaft 142. Thus shaft 142 is selectively in contact with either the rubber or elastomeric surface of bearing strip 150 or in contact with the ultra high molecular weight polyethylene surface of bearing strip 140. As clearly shown in FIG. 12, the shaft 142 is in the run condition where such shaft 142 is in frictional contact with the water lubricated rubber or elastomeric bearings while FIG. 13 discloses the starting condition for rotating shaft 142 wherein such shaft 142 is in frictional contact with the ultra high molecular weight polyethylene bearing surfaces 140.

We claim:

1. A journal bearing assembly having a rigid support sleeve with a longitudinally extending center line, a plurality of circumferentially spaced first set of bearing elements mounted in said support sleeve, said first set of bearing elements having generally flat support surfaces for supporting a shaft, at least two of said first set of bearing elements having a bearing element therein for movement radially to and from said center line to selectively support a shaft journaled thereon independently of said first set of bearing elements that contained said moveable bearing elements, said radially moveable bearing elements defining a second set of bearing elements, power means connected to said second set of bearing elements operative to selectively move said second set of bearing elements radially to and from said center line, and said first set of bearing elements having a coefficient of friction that is different from the coefficient of friction of said second set of bearing elements.

2. A journal bearing assembly as set forth in claim 1 wherein the starting coefficient of friction of said first set of bearing elements is less than the starting coefficient of friction of said second set of bearing elements.

3. A journal bearing assembly as set forth in claim 1 wherein said first set of bearing elements are made from an elastomeric material, and said second set of bearing elements have radially disposed inner surfaces of plastic material.

4. A journal bearing assembly as set forth in claim 1 wherein said first set of bearing elements are made from plastic materials, and said second set of bearing elements have radially disposed inner surfaces of elastomeric material.

5. A journal bearing assembly as set forth in claim 3 wherein said plastic material is an ultra-high molecular weight material.

6. A journal bearing assembly as set forth in claim 1 wherein said starting coefficient of friction of said second set of bearing elements is less than the starting coefficient of friction of said first set of bearing elements.

7. A cylindrical water-lubricated bearing comprising a plurality of circumferentially spaced bearing portions of resilient elastomeric material defining a first set of bearing elements, said bearing portions secured to an annular rigid supporting member, said circumferentially spaced bearing portions defining a central passageway with a central axis, at least two of said first set of bearing elements having inserts therein defining a second set of bearing elements moveable radially to and from said axis to project radially inwardly closer to said axis than the radial innermost surface of said first set of bearing elements from which said second set project, power operated means connected to said second set of bearing elements and operative to selectively radially move said second set of bearing elements.

8. A cylindrical water-lubricated bearing as set forth in claim 7 wherein said first set of bearing elements are made from an elastomeric material and said outermost face of said second set of bearing elements are made from a plastic material.

9. A bearing assembly for a rotating shaft, said assembly having a rigid cylindrical shell, an elastomeric support member mounted in said shell, said support member having a plurality of circumferentially spaced longitudinally extending lubricant passageways defining circumferentially spaced support surfaces therebetween, a shaft journaled on said elastomeric support surfaces for frictional contact thereby, said shaft having a center line, at least two of said support surfaces having recesses, a slide member of plastic material mounted in said recesses for movement toward and away from said center line, means operatively connected to said slide members for selectively moving said slide members radially inwardly toward said center line to selectively provide support for said shaft.

10. A bearing assembly for a rotating shaft comprising a shell member, a plurality of circumferentially spaced support members mounted in said shell defining an opening with a plurality of circumferentially spaced planar bearing surfaces defining a first set of bearing elements, a shaft journaled in said opening and operative to contact said support members for rotaion thereon, said shaft having a center line, said support member having forwardly disposed portions of elastomeric material and operative to support said shaft for rotation, at least two of said support members having plastic inserts moveable radially to and from said center line, and actuating means connected to each of said plastic inserts for selectively moving said inserts toward said center line to contact said shaft for support in rotation thereon, and out of contact with said elastomeric material of said support member to provide a different coefficient of friction for said shaft.

11. A bearing assembly for a rotating shaft comprising a shell member, a plurality of circumferentially spaced support members mounted in said shell, bearing means mounted in each of said support members for supporting a shaft for rotation about a centerline, each of said bearing means having at least a pair of moveable bearing elements defining a first set and a second set of bearing elements, and actuating means connected to all of said first set of bearing elements and to all of said second set of bearing elements to selectively move either said first set or said second set of bearing elements into and out of contact with said shaft to provide a different coefficient of friction for rotation of said shaft.

12. A bearing assembly as set forth in claim 11 wherein said actuating means includes inflatable hoses located radially outwardly of said moveable bearing elements but in abutting contact with said first set and said second set of moveable bearing elements.

13. A bearing assembly as set forth in claim 12 wherein said first set of bearing elements includes a pair of circumferentially spaced ultra high molecular weight polyethylene strips for each of said support members, and said second set of bearing elements includes an elastomeric strip for each of said support members located between each of said pairs of ultra high molecular weight polyethylene strips for each of said support members.

14. A bearing assembly for a rotating shaft comprising a shell member having a central bore with a longitudinal centerline therethrough, a plurality of circumferentially spaced support members mounted in said shell, each of said support members having bearing means mounted therein for supporting a shaft for rotation, at least certain ones of said bearing means having moveable bearing elements defining a first set and a second set of bearing elements, actuating means connected to all of said first set of bearing elements and to all of said second set of bearing elements to selectively move either said first set or said second set of bearing elements into and out of contact with said shaft, and said first set of bearing elements having a different coefficient of friction from said second set of bearing elements.

15. A bearing assembly as set forth in claim 14 wherein said first set of bearing elements includes a pair of circumferentially spaced ultra high molecular weight polyethylene strips for each support member that has said certain ones of said bearing means with said moveable bearing elements, and said second set of bearing elements includes an elastomeric strip for each of said support members that has said pair of spaced ultra high molecular weight polyethylene strips, and said elastomeric strips are located between said polyethylene strips.

* * * * *